UNITED STATES PATENT OFFICE.

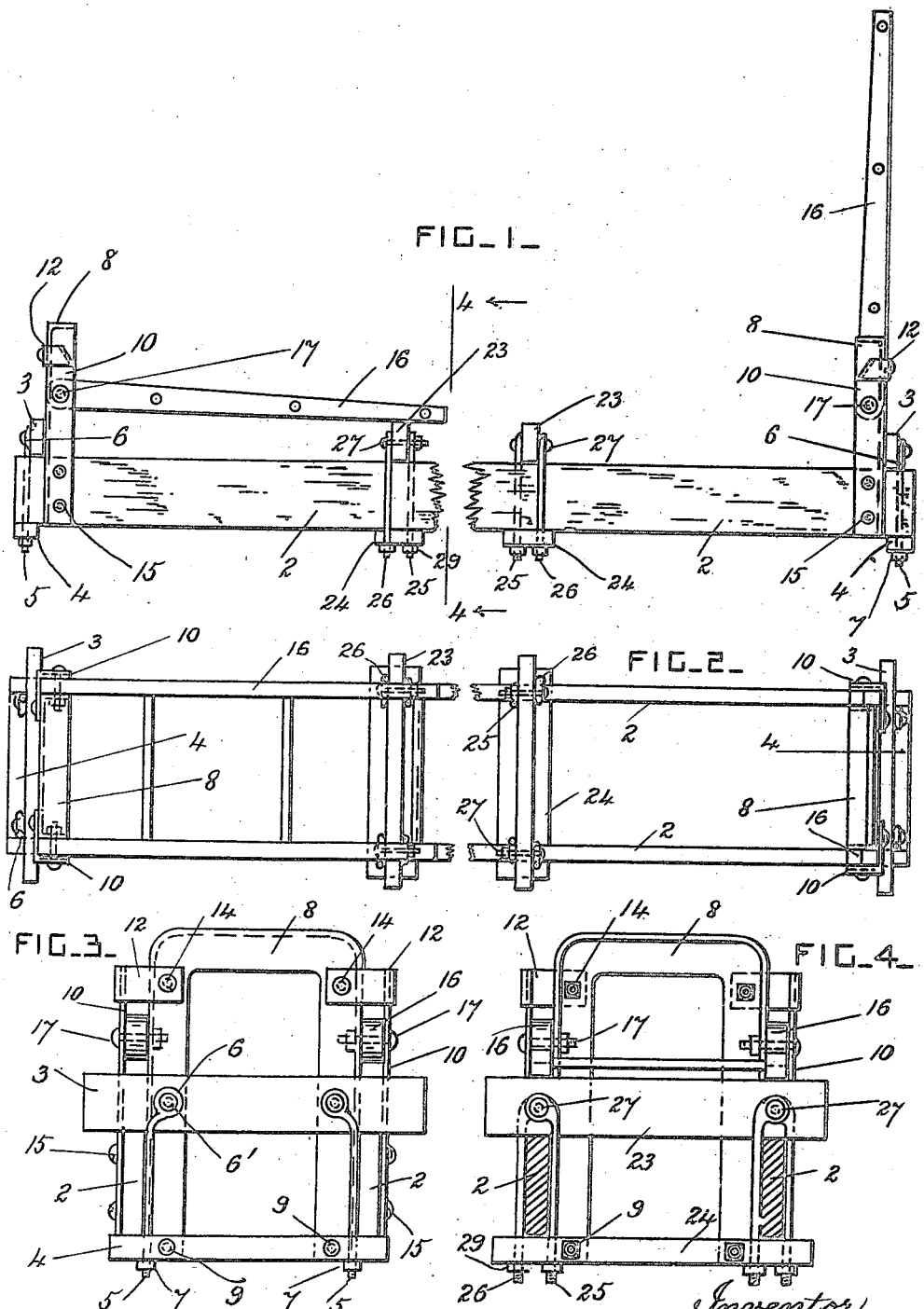

EDSON M. BROMLEY, OF BRISTOL, ILLINOIS.

HAYRACK.

1,425,171. Specification of Letters Patent. Patented Aug. 8, 1922.

Application filed September 3, 1921. Serial No. 498,330.

*To all whom it may concern:*

Be it known that I, EDSON M. BROMLEY, a citizen of the United States, residing at Bristol, in the county of Kendall and State of Illinois, have invented certain new and useful Improvements in Hayracks; and I do hereby declare the following to be a full, clear, and exact description of the invention, such as will enable others skilled in the art to which it appertains to make and use the same.

This invention relates to hay racks adapted to be secured on top of a wagon body to support a load of hay or other similar material; and it consists in the novel construction and combination of the parts hereinafter fully described and claimed.

In the drawings, Figure 1 is a side view of a hay rack constructed according to this invention, showing one of the end frames or ladders folded down. Fig. 2 is a plan view of the same. Fig. 3 is an end view of the hay rack. Fig 4 is a cross-section through the hay rack, taken on the line 4—4 in Fig 1.

The hay rack has two longitudinal side bars or sills 2, which are adapted to be secured on top of a wagon body in any approved way. End crossbars 3 are arranged crosswise of the side bars 2, and rest on their tops and project laterally of them. As the devices at each end of the rack are alike the description will be confined to those at the rear end. A different construction can be adopted for those at the front end, if desirable.

A crossbar 4 is arranged under the bottom of the rear end portions of the side bars 2, and 5 are eye bolts having offset eyes 6 at their tops which are secured to the upper crossbar 3 by bolts 6'. The shanks of the eye bolts are offset in opposite directions so that they lie close to the inner sides of the side bars 2, and nuts 7 are screwed on their lower end portions below the crossbar 4.

An arch-shaped metallic end frame or stub ladder 8 is secured to the crossbar 3 by the said bolts 6', and its lower end portions are secured to the crossbar 4 by bolts 9. The arch-shaped part of the frame 8 projects above the top of the crossbar 3, and the frame is formed of angle iron, and is arranged with its outer flanges bearing against the inner sides of the side bars 2.

Supports 10 are provided on each side of the rack, and consist of flat plates arranged outside the side bars 2, and having their upper end portions twisted to form laterally projecting lugs 12 which are secured to the upper part of the frame 8 by bolts 14. The supports 10 and the outer flanges of the frame 8 are secured to the side bars 2 by bolts 15.

A foldable end frame or ladder 16 is provided, and is of any approved construction, and the lower end portions of its side bars are pivoted on bolts 17 in the spaces between the supports 10 and the frame 8. The lugs 12 form stops for this end frame to engage with when it is raised to its vertical position.

When the end frame is folded down its upper end portion rests on an intermediate crossbar 23 which is secured to the side bars 2 at a suitable distance from the end crossbar 3. A lower crossbar 24 is arranged under the side bars 2 below the upper crossbar 23, and 25 and 26 are eye bolts which are arranged in pairs upon opposite sides of the upper crossbar 23, and are secured to it by bolts 27. The shanks of the eye bolts 25 are arranged against the inner sides of the side bars 2, and the shanks of the eye bolts 26 are arranged against their outer sides, the shanks of the eye bolts of each pair being offset from their eyes in opposite directions so that each fastening bolt 27 will pass through the eyes of a pair of eye bolts.

Nuts 29 are screwed on the bottom end portions of the shanks of the eye bolts which project through holes in the lower crossbar 24. A hay rack constructed in this manner is very strong and substantial. It is also easily put together, and is inexpensive to manufacture.

What I claim is:

1. In a hay rack, two side bars, end crossbars arranged above and below the side bars, an arch-shaped frame having its lower parts arranged between the side bars with its arch-shaped top projecting above them, fastening devices securing all the said parts together, and a foldable end frame pivoted to the side portions of the arch-shaped frame above the said side bars.

2. In a hay rack, two side bars, end crossbars arranged above and below the side bars, an arch-shaped frame having its lower parts arranged between the side bars, supports arranged on the outside of the said side bars and having laterally projecting lugs at their tops which extend over the side bars, fastening devices securing all the said parts together, and a foldable end frame pivoted between the said supports and the side portions of the arch-shaped frame above the said side bars and engaging with the said lugs when raised.

3. In a hay rack, two side bars, end crossbars arranged above and below the side bars, an arch-shaped frame having its lower parts arranged between the side bars with its arch-shaped top projecting above them, eye bolts having their shanks offset in opposite directions and bearing against the inner sides of the side bars and passing through holes in the lower crossbar and having nuts on their lower ends, bolts securing the eyes of the eye bolts to the arch-shaped frame, and bolts securing the arch-shaped frame to the side bars and to the lower crossbar.

In testimony whereof I have affixed my signature.

EDSON M. BROMLEY.